United States Patent
Tucker et al.

(10) Patent No.: US 11,736,774 B2
(45) Date of Patent: Aug. 22, 2023

(54) SEAMLESS CONTENT TRANSITION BETWEEN PROXIMATE USER DEVICES

(71) Applicant: T-Mobile USA, Inc., Bellevue, WA (US)

(72) Inventors: Wilfred Tucker, Centennial, CO (US); Nicholas Pipher, Parker, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/184,455

(22) Filed: Feb. 24, 2021

(65) Prior Publication Data

US 2022/0272420 A1 Aug. 25, 2022

(51) Int. Cl.
*H04N 21/647* (2011.01)
*H04N 21/442* (2011.01)
*H04N 21/488* (2011.01)
*H04N 21/4363* (2011.01)
*H04N 21/4627* (2011.01)
*H04L 65/61* (2022.01)

(52) U.S. Cl.
CPC ....... *H04N 21/64738* (2013.01); *H04L 65/61* (2022.05); *H04N 21/43637* (2013.01); *H04N 21/44209* (2013.01); *H04N 21/4627* (2013.01); *H04N 21/4882* (2013.01); *H04N 21/64753* (2013.01)

(58) Field of Classification Search
CPC ......... H04N 21/64738; H04N 21/4882; H04N 21/4627; H04N 21/64753; H04N 21/44209; H04N 21/43637; H04L 65/4069
See application file for complete search history.

(56) References Cited

U.S. PATENT DOCUMENTS

| | | | |
|---|---|---|---|
| 6,684,400 | B1 | 1/2004 | Goode et al. |
| 8,200,747 | B2 | 6/2012 | Apostolopoulos et al. |
| 9,384,331 | B2 | 7/2016 | Shirron et al. |
| 9,626,363 | B2 | 4/2017 | Rosenblatt et al. |
| 10,306,301 | B2 * | 5/2019 | Cholas .............. H04N 21/6118 |

(Continued)

OTHER PUBLICATIONS

U.S. Appl. No. 16/890,831, Notice of Allowance dated Nov. 2, 2021, 26 pages.

(Continued)

*Primary Examiner* — Alazar Tilahun
(74) *Attorney, Agent, or Firm* — Han Santos, PLLC

(57) ABSTRACT

Described herein are techniques for seamlessly transitioning streaming content between user devices. In some embodiments, such techniques may be performed by a content transition platform. The techniques may comprise receiving a transition request including a set of identifiers for a plurality of user devices that includes at least a first user device from which the transition request originated. The techniques may further comprise identifying one or more active communication sessions associated with the plurality of user devices, each of which comprise a series of communications between one of the plurality of user devices and a content provider. The techniques may further comprise determining, based on the one or more active communication sessions, a second user device of the plurality of user devices, and transitioning an active communication session of the one or more active communication sessions between the first user device and the second user device.

17 Claims, 7 Drawing Sheets

(56) References Cited

U.S. PATENT DOCUMENTS

| | | |
|---|---|---|
| 10,545,641 B2 | 1/2020 | Das |
| 2006/0030356 A1 | 2/2006 | Haub et al. |
| 2007/0234048 A1* | 10/2007 | Ziv .................. H04N 21/4627 |
| | | 713/159 |
| 2008/0081558 A1 | 4/2008 | Dunko et al. |
| 2008/0134256 A1 | 6/2008 | daCosta |
| 2012/0030632 A1 | 2/2012 | McRae et al. |
| 2012/0082424 A1 | 4/2012 | Hubner et al. |
| 2012/0210373 A1* | 8/2012 | Wong ............... H04N 21/64322 |
| | | 725/110 |
| 2012/0290657 A1 | 11/2012 | Parks et al. |
| 2014/0006483 A1* | 1/2014 | Garmark ............. H04L 65/1083 |
| | | 709/203 |
| 2014/0105561 A1 | 4/2014 | Chen et al. |
| 2014/0258268 A1 | 9/2014 | Woods |
| 2015/0242597 A1 | 8/2015 | Danciu |
| 2015/0356949 A1 | 12/2015 | Kim |
| 2016/0142750 A1 | 5/2016 | Huber et al. |

OTHER PUBLICATIONS

U.S. Appl. No. 16/890,852, Corrected Notice of Allowability dated Nov. 10, 2021, 6 pages.

U.S. Appl. No. 16/890,852, Notice of Allowance dated Sep. 29, 2021, 36 pages.

U.S. Appl. No. 16/890,831, Office Action dated Apr. 29, 2021, 29 pages.

U.S. Appl. No. 16/890,852, Final Office Action dated Apr. 30, 2021, 18 pages.

U.S. Appl. No. 16/890,831, Notice of Allowance dated Aug. 5, 2021, 22 pages.

Ritchie, R.; "Why I Want to See Handoff for iTunes in iOS 10 so Ludicrously Much"; iMore; httos//www.imore.com/handoff-itunes-ios-10-would-be-ludicrouslv-areat; Mar. 7, 2016, Do. 1-7.

U.S. Appl. No. 16/890,852, Non-Final Office Action dated Jan. 13, 2021, 28 pages.

Whitney, L.; "How to Use Apple Handoff"; PCMag; https://www.pcmag.com/how-to/how-to-use apple-handoff; Jan. 28, 2019, DO. 1-10.

\* cited by examiner

SEAMLESS CONTENT TRANSITION BETWEEN PROXIMATE USER DEVICES

BACKGROUND

Media content (such as television and radio) is now more accessible to more users and on more platforms than it has ever been. Users can now consume a variety of content from a variety of different devices. It is estimated that there are an average of two televisions and two smartphones per household in the United States. However, transitioning from consuming content on one user device to consuming that same content on another user device may be difficult.

SUMMARY

Techniques are provided herein for enabling a seamless handoff of streaming media content between user devices. Such techniques may enable content that is currently streaming on a first user device to be synchronized between the first user device and a second user device, and/or transitioned to the second user device. In some embodiments, when one or more user devices receives a request for a content handoff, such one or more user devices may identify one or more additional proximate user devices to be the target of the handoff. An indication of the identified one or more additional proximate user devices is provided to a content transitioning platform within a transition request.

Upon receiving a request to transition content that includes at least an indication of one or more additional proximate user devices, the content transition platform may identify at least one current communication session associated with the one or more additional proximate user devices. The communication session information may be used to verify the target user device of the transition request. Once the target user device has been verified, the content transition platform may duplicate and/or transition the communication session to or from the target user device.

In some embodiments, a determination may be made as to whether the one or more additional proximate user devices have access rights to the content to be transitioned between user devices (e.g., whether the user devices are associated with the same account, etc.) as well as permission to transition the content. If the target user device to which streaming content is to be transitioned does not have such access rights, then a determination may be made as to whether such rights can be obtained from the transitioning user device.

Embodiments of the disclosure provide several advantages over conventional systems. For example, embodiments of the system described herein enable a user to continue to consume streaming content without interruption and without providing additional login credentials in a simplified manner. The content transition platform enables streaming content to be transitioned amongst proximate user devices at the discretion of the user. In conventional systems, a user who wishes to watch mobile device content on a larger screen can screen share (or screen mirror) or "cast" mobile device content to his or her TV. However, current screen sharing, screen mirroring, and casting techniques are not user-friendly and only work in specific scenarios. For example, current casting techniques only allow casting in one direction. That is, a user can use casting techniques to share video from a mobile device to a TV, but cannot use casting techniques to share video from the TV to the mobile device. Additionally, other than a "device discovery" process as performed by one of the user devices, the content transition platform enables transitioning of streaming content between the user devices without any direct interaction needing to occur between those user devices (e.g., no handing off of tokens, etc.).

By way of illustrating embodiments of the system as described herein, consider the following exemplary use cases. In an example use case, a user may be watching a movie on her TV but may need to take her dog for a walk. The user may grab her mobile device as she gets up from the couch, walk to the TV or set top box (STB), and perform a gesture, such as lightly touching her mobile device to the TV or STB. The user may then see a message on her mobile device asking if she wants to sync her content and may confirm (e.g., by selecting "yes" via a user interface of the mobile device), and the movie may begin playing on the user's mobile device. Accordingly, the user may continue to watch her movie via her mobile device while taking her dog for a walk.

In another example use case, as a user is watching his favorite team play in a critical game on his living room TV, the game enters overtime and it is getting late. The user may decide to head upstairs to watch the game on his bedroom TV, so he may grab his mobile device as he gets up from his recliner and touch it to his TV/STB. A message may pop up on his mobile device asking if he wants to sync his content, and he may select "yes" via a user interface of his mobile device to confirm. Accordingly, the user can watch the game on his mobile device as he locks up and turns off the lights and heads upstairs. When the user gets to his bedroom he may touch the mobile device to his bedroom TV/STB, and consequently see a message on the TV asking if he wants to sync his content to that TV. Accordingly, the user may select "yes" and start watching the game on his bedroom TV.

In still another example use case, a user may be watching a movie while riding a stationary bike at the gym but may not finish the movie before the end of her workout. When the user arrives home, she may start watching again for a brief moment on her mobile device and walk over to the living room TV/STB, where she waves her mobile device in front of the TV/STB. A message may appear asking if she wants to sync her content, and she may confirm by selecting "yes" via a user interface. Accordingly, the user may finish watching her movie on her living room TV.

In one embodiment, a method is disclosed as being performed by a content transition platform, the method comprising receiving a transition request, the transition request including a set of identifiers for a plurality of user devices that includes at least a first user device from which the transition request originated, identifying one or more active communication sessions associated with the plurality of user devices, the one or more active communication sessions comprising a series of communications between one of the plurality of user devices and a content provider, determining, based on the one or more active communication sessions, a second user device of the plurality of user devices, and transitioning an active communication session of the one or more active communication sessions between the first user device and the second user device.

An embodiment is directed to a computing device comprising: a processor; and a memory including instructions that, when executed with the processor, cause the computing device to receive a transition request, the transition request including a set of identifiers for a plurality of user devices that includes at least a first user device from which the transition request originated, identify one or more active communication sessions associated with the plurality of user devices, the one or more active communication sessions comprising a series of communications between one of the plurality of user devices and a content provider, determine, based on the one or more active communication sessions, a second user device of the plurality of user devices, and transition an active communication session of the one or more active communication sessions between the first user device and the second user device.

An embodiment is directed to a non-transitory computer-readable media collectively storing computer-executable instructions that upon execution cause one or more computing devices to receive a transition request, the transition request including a set of identifiers for a plurality of user devices that includes at least a first user device from which the transition request originated, identify one or more active communication sessions associated with the plurality of user devices, the one or more active communication sessions comprising a series of communications between one of the plurality of user devices and a content provider, determine, based on the one or more active communication sessions, a second user device of the plurality of user devices, and transition an active communication session of the one or more active communication sessions between the first user device and the second user device.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
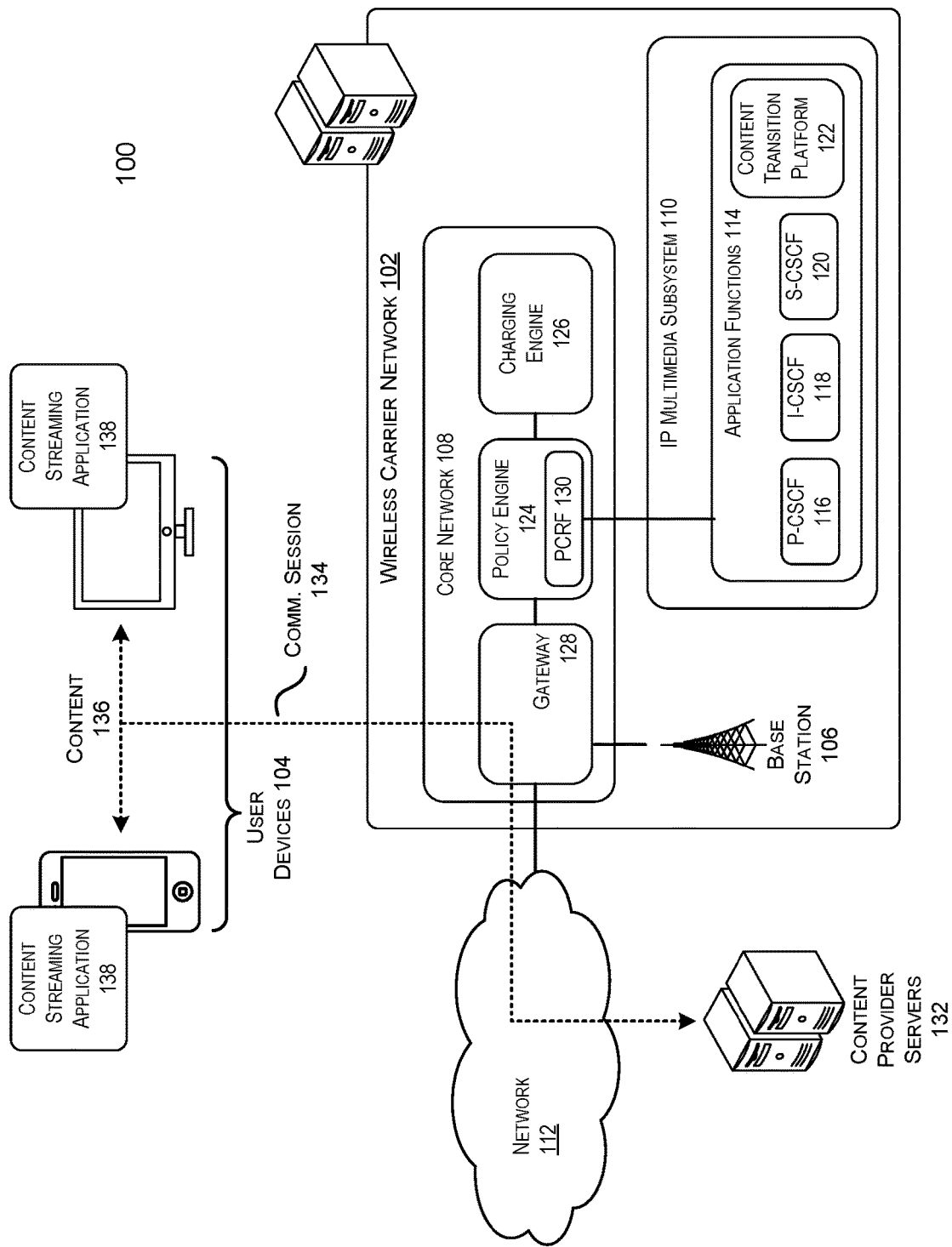
FIG. 1 illustrates an example architecture of a wireless carrier network for implementing techniques for providing seamless transitioning of content between user devices in accordance with embodiments of the disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that may be used to enable seamless transitions of streaming content between different user devices. In some embodiments, a user may indicate that he or she wishes to transition content from one user device to another using one of the two user devices. Such an indication may be provided using a command entered via a user interface or via a gesture performed with respect to the user device. In some cases, upon receiving such an indication, the user device may perform a device discovery operation to identify any proximate additional user devices that are wirelessly enabled. The user device may initiate the transition of streaming content by providing a transition request to a content transition platform that includes an indication of the proximate user devices.

Upon receiving a request to transition streaming content between two devices, one or more potential communication sessions are identified as a potential target of the transition request. To identify such potential communication sessions, a number of user devices may be identified in the vicinity of the user device from which the transition request originated. In some cases, that user device may identify such user devices via a discovery process during which a short-range wireless communication channel is activated and identifiers for a number of devices detected via the short-range wireless communication channel are obtained. The user device may pass these identifiers to the wireless communication network. Communication sessions associated with the identified user devices may then be identified by monitoring (e.g., at a network gateway) for network traffic directed to or from each of the user devices. In some embodiments, a data type of data being transmitted within such network traffic may be determined to be associated with streaming content.

Once a communication session has been identified as a likely target of the transition request (which may require verification by a user), the communication session is updated such that network traffic associated with that communication session is transmitted to a user device that is a target of the transition request (which may be selected by a user). Such network traffic may be routed to the target user device instead of, or in addition to, the network traffic being routed to its original recipient. Techniques for accomplishing this are discussed in greater detail below.

FIG. 1 illustrates an example architecture of a wireless carrier network for implementing techniques for providing seamless transitioning of content between user devices in accordance with embodiments of the disclosure. The architecture 100 may include a wireless carrier network 102 that serves multiple user devices, such as user devices 104.

The wireless carrier network 102 may include multiple base stations, such as the base station 106, as well as a core network 108 and an IP Multimedia Subsystem (IMS) core 110. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long-term Evolution (LTE), CDMA-2000 (Code Division Multiple Access 2000), $4^{th}$ Generation (4G), $5^{th}$ Generation (5G), and/or so forth. The base stations are responsible for handling data traffic between user devices and the core network 108. In some embodiments, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from user devices.

The core network 108 may provide telecommunication and data communication services to multiple user devices 104. For example, the core network 108 may connect the user devices 104 to other telecommunication and data communication networks, such as a network 112 and/or a public switched telephone network (PSTN). Accordingly, data packet communications via the core network 108 and the network 112 may support a variety of services provided via a remote connection.

In various embodiments, an IP Multimedia Subsystem 110 may reside on the wireless carrier network 102. The IP Multimedia Subsystem 110 may include one or more application functions 114. In various embodiments, the application functions 114 may include a Proxy Call Session Control Function (P-CSCF) 116, Interrogating Call Session Control Function (I-CSCF) 118, Serving Call Session Control Function (S-CSCF) 120 or an equivalent function. In instances in which the application functions 114 include the P-CSCF 116, the P-CSCF 116 may route incoming SIP messages to an IMS registrar server. The P-CSCF 116 may also safeguard the security of the wireless carrier network by handling Internet Protocol Security (IPSec) for communications that are exchanged by the user devices 104. In some alternative instances, instead of SIP sessions, the P-CSCF may handle Remote Authentication Dial-In User Service (RADIUS) sessions. The P-CSCF may interact with the I-CSCF 118, and S-CSCF 120. The S-CSCF may communicate with a telephony application server (TAS) that resides in the core network 108. The TAS may route voice and/or data communications within the wireless carrier network 102 and with other networks, including public switch telephone networks (PSTNs). For example, the TAS may be a SIP application server that handles IP telephony for voice over LTE (VoLTE) services. Collectively, the CSCFs may handle Session Initiation Protocol (SIP) sessions, which are communication sessions for packet-based voice and video calls, instant messaging over IP networks, and/or so forth. The application functions 114 may further include content transition platform 122 configured to enable seamless transition of content streams between user devices. This is described in greater detail below.

It should be noted that while the content transition platform 122 is depicted in system 100 as being included within an IP Multimedia Subsystem 110, this is merely an example embodiment. One skilled in the art would recognize that an equivalent of a content transition platform 122 may be implemented outside of the IP Multimedia Subsystem, and even outside of the wireless carrier network (e.g., as a standalone platform). In some embodiments, an equivalent of the content transition platform may be implemented by one or more content providers.

The core network 108 may further include a policy engine 124, a charging engine 126, and a gateway 128. The policy engine 124 may be a software component that determines policy and enforces policy rules and serves to establish calls and allocate bandwidth to communications routed via the wireless carrier network. In various embodiments, the policy engine 124 may include a Policy and Charging Rules Function (PCRF) 130 or another equivalent core network component of the wireless carrier network 102. Accordingly, the policy engine 124 may interface with the application functions 114 to handle incoming and outgoing communications.

The charging engine 126 may enable the wireless carrier network 102 to monitor the services, such as data, voice, text, etc., that are used by each subscriber, and charge the subscribers in real-time based on service usage. In various embodiments, the charging engine 126 may be an Online Charging System (OCS) or another equivalent core network component of the wireless carrier network 102.

The gateway 128 may include one or more servers and related components that are tasked with providing connectivity between the IP Multimedia Subsystem 110, the user devices 104, and one or more content provider servers 132 by acting as a point of entry and exit for data traffic. In turn, the IP Multimedia Subsystem 110 may provide the user devices with data access to external packet data networks 112, such as the networks of other wireless telecommunication providers or the Internet. Accordingly, the gateway 128 may perform functions such as policy enforcement, packet filtering, packet screening, and/or charging support. In various embodiments, the gateway 128 may be a Packet Data Network Gateway (PGW) or another equivalent core network component of the wireless carrier network 102.

In some embodiments, the gateway 128 may manage one or more communication sessions 134. Each communication session may represent an active communication session between a particular user device and a particular content provider server over which streaming content 136 is currently being provided. For example, a communication session may consist of an active communication session over which streaming video is being provided by a streaming video provider in order to be consumed on the user device. In this example, the gateway routes streaming video data between an egress point of network 112, which may be the Internet, to the user device via wireless communications established using the base station(s) 106.

A user device 104 may be any suitable electronic device capable of interacting with at least one other electronic device (e.g., content provider servers 132) in order to consume online services. In some embodiments, the user device 104 may include one or more outputs (e.g., a display, speakers, etc.) via which multimedia content may be presented to a user. Additionally, the user device 104 may include one or more input devices configured to collect input from a user of the user device. The user device 104 may include a memory that stores computer executable instructions. Such a user device 104 may include TVs and/or set top boxes associated with TVs, game consoles, mobile computing devices such as smart phone or tablets, smart watches, head-mounted displays (HMD), digital assistant devices, smart appliances, and/or other devices suitable for playing streaming media content. The user devices 104 may be further configured to communicate with each other via short-range communication channels.

In embodiments, a user may be associated with a number of different user devices 104. The types and/or models of user devices 104 may vary, as may be a primary function performed by each of those user devices. Each of the user devices 104 may be associated with a particular user and/or account with the wireless carrier network for which wireless communication services are provided. In some embodiments, the wireless carrier network may monitor network traffic to and from each of those different user devices in order to identify active communication sessions. In some embodiments, the wireless carrier network may determine one or more content providers associated with the active communication sessions based on the destination and/or origin of network traffic within those communication sessions. Additionally, the wireless carrier network may determine a type or category of content 136 being consumed via the user devices 104 based on a type of data being transmitted over the communication session 134 and/or the identified content provider associated with the communication session.

One or more of the user devices 104 may have installed upon them an instance of a content streaming application 138. In some embodiments, the content streaming application 138 may be configured to enable the user device to access content 136 as made available by a content provider server 132. In some embodiments, the content streaming application 138 may be associated with a particular content provider, in that the content streaming application is maintained by that content provider and is configured to present content made accessible by that content provider. In some embodiments, a content streaming application 138 may be configured to enable the user device to interact with a content transition platform 122 in order to transition a stream of content playing on one user device to a second user device.

The content transition platform 122 may be configured to transition an active communication session from a first user device to a second user device. This results in a stream of content that is being played/displayed on the first user device to be played/displayed upon the second user device. In some embodiments, the content transition platform 122 receives a request to transition a content stream to or from a first user device. In some cases, the first user device may be a user device that is currently playing the content stream. In cases, the first user device may be the user device that a user would like the content stream to be transitioned onto. The request may include an indication of one or more additional user devices located proximate to the first user device. Upon receiving such a request, the content transition platform 122 may identify any active communication sessions associated with the one or more additional user devices. Upon identifying at least one active communication session associated with the additional user devices, the content transition platform may provide a set of the at least one identified communication sessions to the first user device in order to receive a selection and/or verification of a particular communication stream. In some embodiments, the set of communication sessions may be accompanied by information about the respective communication sessions. For example, the set of communication sessions my indicate a type of content being transmitted via the communication session, an identifier for a software application (e.g., a content streaming application) associated with the communication session, an identifier for the user device associated with the communication session, or any other suitable identifying information. In some embodiments, one or more of the identified communication sessions are associated with content being streamed by the first user device. In at least some of these embodiments, a user may be asked to verify a target user device to which the communication session is to be transitioned.

Upon receiving a selection of a communication session from the identified communication sessions, the content transition platform 122 then transitions the identified communication session between (e.g., either to or from) the first user device and a second user device. In some of these embodiments, the second user device is a user device on which a content stream is being consumed. In some of these embodiments, the second user device is a user device to which a content stream is to be transitioned (as indicated by a user). The content transition platform then transitions the content stream as requested. In some embodiments, this comprises causing a software application (e.g., a content streaming application) to execute on the target user device. This may also comprise redirecting network traffic associated with the communication session to the target user device. This is described in greater detail below.

By way of illustrating exemplary interactions between various components of the architecture 100, consider the following example scenario. In this scenario, a user is initially viewing streaming video content on a smart television (i.e., a first user device). The user then initiates a request to transition the streaming video content from the smart television to his or her mobile device (i.e., a second user device). In some embodiments, such a request may be initiated by selecting an option on a graphical user interface (GUI) of the mobile device. In some embodiments, such a request may be initiated by performing a particular gesture that is mapped to the initiation of the request in a gesture library of the operating system of the mobile device.

Upon the user initiating the request, the mobile device may identify a number of other communication-enabled user devices within its proximity. In some embodiments, this may include any user devices that are discoverable to the mobile device via a short-range communication channel (e.g., Bluetooth®, WiFi, etc.), which would include the smart television. The mobile device then transmits a list of the identified communication-enabled user devices to a content transition platform. In this scenario, the content transition platform identifies any active communication sessions associated with the user devices in the identified set of user devices, which would include the communication session associated with the streaming video content being presented on the smart television. In some embodiments, the content transition platform then provides a list of the identified active communication sessions to the mobile device for the user to select from.

Once the communication session associated with the streaming video content playing on the smart television has been identified, the content transition platform initiates a transition of that streaming video content to the mobile device. In some embodiments, this may comprise causing a media content player (i.e., an example of a content streaming application 138) associated with the streaming video content to be executed on the mobile device. In some embodiments, the content transition platform may store and provide login credentials associated with the user for the media content player automatically so that the use is not required to provide those login credentials. In some embodiments, the content transition platform may store one or more session tokens or other identifiers for a set of communications. In these embodiments, the content transition platform may use a session token associated with the smart television to enable the mobile device to access the streaming video content without providing additional access credentials.

Once the media content player has been executed on the mobile device, the content transition platform may transition the streaming video content from the smart television to the mobile device. In some cases, the content transition platform may instruct the gateway 128 to duplicate network traffic directed toward the smart television and route that duplicated network traffic to the mobile device. In some cases, the content transition platform may instruct the gateway 128 to reroute network traffic directed toward the smart television to the mobile device instead. In some embodiments, the content transition platform may interact with a content provider server (e.g., via an application programming interface) to replace a device identifier for the smart television within a communication session to a device identifier associated with the mobile device.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
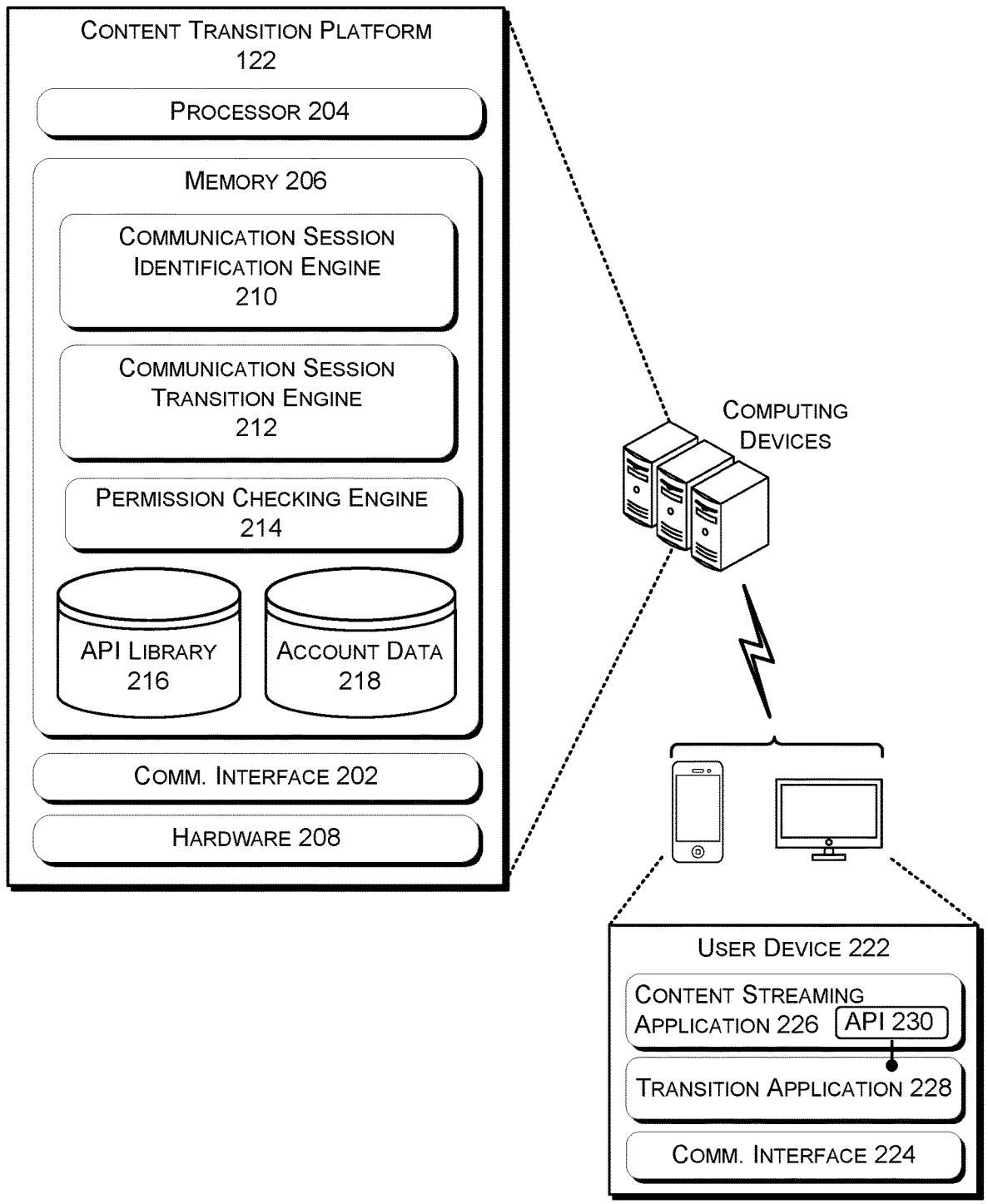
FIG. 2 is a block diagram showing various components of a computing system architecture that supports seamless transitions of streaming content between user devices.

FIG. 2 is a block diagram showing various components of a computing system architecture that supports seamless transitions of streaming content between user devices. The system architecture may include a content transition platform 122 that comprises one or more computing devices. The content transition platform 122 may include a communication interface 202, one or more processors 204, memory 206, and hardware 208. The communication interface 202 may include wireless and/or wired communication components that enable the content transition platform 122 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The content transition platform 122 can include any computing device configured to perform at least a portion of the operations described herein. The content transition platform 122 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The content transition platform 122 can include one or more virtual machines running virtual operating systems, or other computing architectures involving virtualization such as one or more flexible pools of logical storage devices that can be virtualized to maintain virtual storage devices for the computer. For example, the content transition platform 122 may include virtual computing devices in the form of virtual machines or software containers that are hosted in a cloud.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the content transition platform 122 may implement functionality that includes one or more software modules and data stores. Such software modules may include routines, program instructions, objects, and/or data structures that are executed by the processors 204 to perform particular tasks or implement particular data types. More particularly, the memory 206 may include a module that is configured to identify one or more active communication sessions to be transitioned (communication session identification engine 210) as well as a module that initiates a transition of a communication session from one user device to another (communication session transition engine 212), and a module that determines a status of access rights with respect to a request to transition content. Additionally, the memory 206 may include various data stores. For example, the memory 206 may include a library of application programming interfaces (API library 216) as well as information about user accounts and associated user devices (account data 218).

The communication session identification engine 210 may be configured to, in conjunction with the processor 204, identify an active communication session to be the target of a transition. In some embodiments, a request to transition a content stream may include identifiers for the user device from which the request originated as well as identifiers for a number of additional user devices in the vicinity of that user device. Upon receiving the identifiers for the respective user devices (i.e., a set of potential target user devices), the communication session identification engine 210 queries a core network (e.g., core network 108 of FIG. 1) to identify any currently-active communication sessions that are associated with each of the respective user devices. To do this, the core network may identify network traffic between the user device and some other entity. The communication session identification engine 210 may then determine whether the entity that the respective user device is in communication with is a provider of streaming content. In some cases, this may comprise comparing the entity to a list of streaming content providers to identify a match. In some cases, this may comprise determining whether a data type of the data being transmitted via the network traffic is associated with streaming content.

Once a number of currently-active communication sessions have been identified as potential target communication sessions with respect to the number of user device identifiers, the communication session identification engine 210 may then filter out communication sessions that are not eligible for transition. To do so, the communication session identification engine 210 may first determine a content provider associated with each of identified communication sessions (e.g., based on a recipient or originator of network traffic within the respective communication session). The communication session identification engine 210 may determine whether one or more of the indicated user devices is capable of presenting streaming content received from the identified content provider. In some cases, this may comprise determining whether any of the other user devices are physically capable of presenting the streaming content. For example, if the respective communication session pertains to streaming video, but none of the indicated user devices are capable of presenting streaming video, then the communication session may be removed from the set of potential target communication sessions. In some embodiments, the content transition platform maintains a mapping of types of user device to capabilities and/or features. For example, the content transition platform may maintain a listing of types of user devices capable of presenting audio streaming content, video streaming content, or any other suitable type of streaming content. In another example, the content transition platform may maintain a listing of features associated with each type of user device (e.g., graphic processing power, video buffer size, modem data rate, etc.) that can be compared against information about the network traffic transmitted over the communication session (e.g., the processing power and data bandwidth requirements) in order to determine whether the user device is capable of supporting the network traffic.

In some cases, determining whether one or more of the indicated user devices is capable of presenting streaming content may comprise determining whether the respective user device has permissions to access the streaming content. Once a subset of the potential target user devices has been identified based on active communication sessions and capabilities, the communication session identification engine 210 may verify a target user device from the set of potential target user devices. This may comprise providing a notification to the user device from which the request originated and receiving a selection of a target user device (or streaming content) from the user.

In some embodiments, the communication session identification engine 210 calls an instance of the permission checking engine 214 to determine if one or more of the user devices has access rights to streaming content provided by the content provider. Upon a determination that the target user device to which the streaming content is to be transitioned does have access rights in the streaming content, the communication session identification engine 210 may call an instance of the communication session transition engine 212 to initiate the transition.

The communication session transition engine 212 may be configured to, in conjunction with the processor 204, transition a communication session from a first user device to a second user device. In some embodiments, this may comprise replacing an identifier within network traffic directed to or from the first user device with an identifier for the second user device, such that the network traffic is redirected to the target user device. An identifier for a user device may be any unique series of characters that can be used to identify a particular user device. For example, an identifier for a user device may comprise a serial number, an Internet Protocol (IP) address, a media access control (MAC) address, an International Mobile Equipment Identifier (IMEI), or any other suitable identifier. To illustrate an example in which an identifier for a user device comprises an IP address, a communication session transition engine 212 may replace an IP address included within header of data packets directed to/received from the first user device with an IP address associated with the second user device and vice versa.

In some embodiments, the communication session transition engine 212 may create a duplicate communication session for the second device. For example, the communication session transition engine 212 may create a new communication session with the respective content provider that mirrors the identified communication session. This may involve invoking, by the communication session transition engine 212, methods to an API associated with the content provider based on information stored in API library 216. In some cases, the communication session transition engine 212 may pass a session token to the content provider that can be used by that content provider to identify the communication session to be duplicated. In this example, a position within the streaming content may be identified from the communication session to be duplicated, such that the duplicate communication session is initiated at that position. The duplicated communication session may include identifiers for the target user device in place of any identifiers for the current user device in the identified communication session.

In some embodiments, in addition to transitioning a communication session from a first user device to a second user device, the communication session transition engine 212 may cause an instance of a software application (e.g., content streaming application 226) to be executed on a user device. To do this, the communication session transition engine 212 may provide instructions to a transition application 228 installed upon, and executed from, the memory of the user device to cause it to execute the software application (e.g., via an API associated with that software application).

The permissions checking engine 214 may be configured to, in conjunction with the processor 204, determine whether a user device has access rights to streaming content to be transitioned to that user device. In some cases, the permission checking engine 214 may determine whether each of a number of user devices is associated with the same account maintained by a wireless carrier network of which the content transition platform is a component. This may comprise checking information from account data 218 about the user device from which the transition request was received. For example, information about multiple user devices associated with a single account may be stored in account data 218. In this example, the identifiers received in the transition request may be compared to the information about the multiple user devices. In some cases, the permission checking engine 214 may further determine what streaming content is accessible by the user device based on the account data. For example, the permission checking engine 214 may identify a number of content providers with which the user device, or underlying account associated with the user (e.g., any account maintained by the user with respect to the operator of the platform 122), maintains a user account. In this example, the permission checking engine 214 may retrieve one or more access credentials that may be used to access a respective user account associated with the communication session. These access credentials may be used to provide automatic login to the account with the content provider for the user.

In some embodiments, upon determining that the user device to which streaming content is to be transferred does not have access rights to that streaming content, the permission checking engine 214 may identify alternative access rights that may be available for that streaming content. For example, the permission checking engine 214 may determine that the streaming content can be purchased or rented. In this example, the permission checking engine 214 may provide a notification to the user device from which the transition request originated to verify that the user wishes to purchase or rent the streaming content. In another example, the permission checking engine 214 may determine whether a user associated with the current communication session has authority to redistribute, sponsor, or otherwise grant access rights in the streaming content. Upon making such a determination, the permission checking engine 214 may provide an indication that the streaming content can be accessed using the access rights associated with the target user device.

In some embodiments, a user of a first user device may sponsor access rights for a second user device. For example, where a first user has access to such rights, but the second user does not, the first user may agree to pay for (or otherwise sponsor) the second user's access to that streaming content. In this example, the second user may send, via a second user device, a request to access content to the first user device. In this example, the first user may indicate, via the first user device, whether he or she wishes to sponsor the access rights. In some cases, upon receiving this indication, an account associated with the first user may be charged for the access rights to the media content. In some cases, credit card information stored in association with the first user's account may be charged for the access rights.

Upon a first user sponsoring a second user's access rights to a particular piece of media content, the second user may then access that media content. In some embodiments, a session token associated with the first user device is provided to the second user device in order to enable the second user device to log into the first user's account with a content provider without having to provide login credentials (protecting the first user from having to provide those login credentials to the second user). In some embodiments, upon identifying a communication session associated with (e.g., initiated by) the second user device and directed to a content provider associated with the sponsored media content, the content transition platform may replace user device identifier information (e.g., IP address) associated with the second user device with user device identifier information associated with the first user device so that the communication session is caused to appear (to the content provider) to originate from the first user device. In this example, the content transition platform may continue to replace identifier information of the network traffic within the communication session.

As noted elsewhere, the content transition platform 122 may be in communication with a number of user devices 222. Such a user device 222 may be any electronic device capable of interacting with the content transition platform 122 as described herein and capable of presenting streaming content to a user. User devices 222 may be examples of user devices 104 as described with respect to FIG. 1 above. The user device 222 may include a processor and a computer readable memory as well as a communication interface 224. The computer readable memory of the user device 222 may include a content streaming application 226 that enables streaming of content received from a content provider. In some embodiments, the computer readable memory of the user device 222 may additionally include a transition application 228 that enables interaction with the content transition platform to initiate a transition of streaming content to or from the user device. In some embodiments, the transition application is configured to interact with one or more content streaming applications 226 using an application programming interface (API) 230 associated with the respective content streaming application. For example, the transition application 228 may cause the content streaming application 226 to be executed on the user device via an API call. In some embodiments, the transition application 226 may execute as a background program on the user device 222 that initiates transition requests upon receiving a request to do so.

The communication interface 224 may include wireless and/or wired communication components that enable the mobile devices to transmit or receive data via a network, such as the Internet. In some embodiments, the communication interface 224 may include both short-range and long-range communication channels. In some embodiments, communications between user devices may be established via a short-range communication channel of the communication interface 224 whereas communications between a user device and the content transition platform 122 may be established via a long-range communication channel.

A short-range communication channel as included within communication interface 224 may include transmitters, receivers, transceivers, etc., and may be configured to send and/or receive short-range wireless communication signals (e.g., Bluetooth® signals, Zigbee® signals, infrared signals, etc.) from one user device to another when the two user devices are within a threshold proximity of one another (e.g., 10 feet, 15 feet, 20 feet, etc.). In some examples, the threshold proximity may be set by a user (e.g., based on known locations of the user's typical user devices). For instance, a user who typically watches television from a TV that is mounted high on a wall may set a higher threshold proximity than a user who typically watches television from a TV that is placed or mounted on a smaller stand. In some examples, a short-range communication interface of a user device may be configured to selectively reduce its power in some instances in order to transmit a low-power short-range signal that is only receivable by a short-range communication interface of another user device when the two user devices are touching one another or are otherwise within a very short range of one another (e.g., 1 inch, 5 inches, etc.).

The transition application 228 may cause the user device 222 to interact with the content transition platform 122 and one or more additional user devices. For example, a communication session may be established between the content transition platform 122 and the user device 222 via the respective communication interfaces 202 and 224. In some embodiments, the transition application 228 may provide the user device 222 with access to functionality provided via one or more modules (e.g., the communication session identification engine 210 and/or the communication session transition engine 212) implemented on the content transition platform 122, as well as provide the user device 222 with the abilities to send data to the one or more modules and receive instructions from the one or more modules. This may be done via the use of one or more APIs associated with the content transition platform. For example, a transition application 228 on the user device may call such an API to access functionality provided by the content transition platform. In some embodiments, the transition application 228 may receive instructions from the content transition platform in relation to actions to be performed on the user device and may execute those actions. For example, the transition application 228 may receive instructions from the content transition platform 122 to either execute or close down an instance of a content streaming application 226 during a transition of content. In this example, the transition application 228, upon receiving these instructions, may make an API call to API 230 to cause an instance of the content streaming application 226 to be executed or closed.

Figure 3:
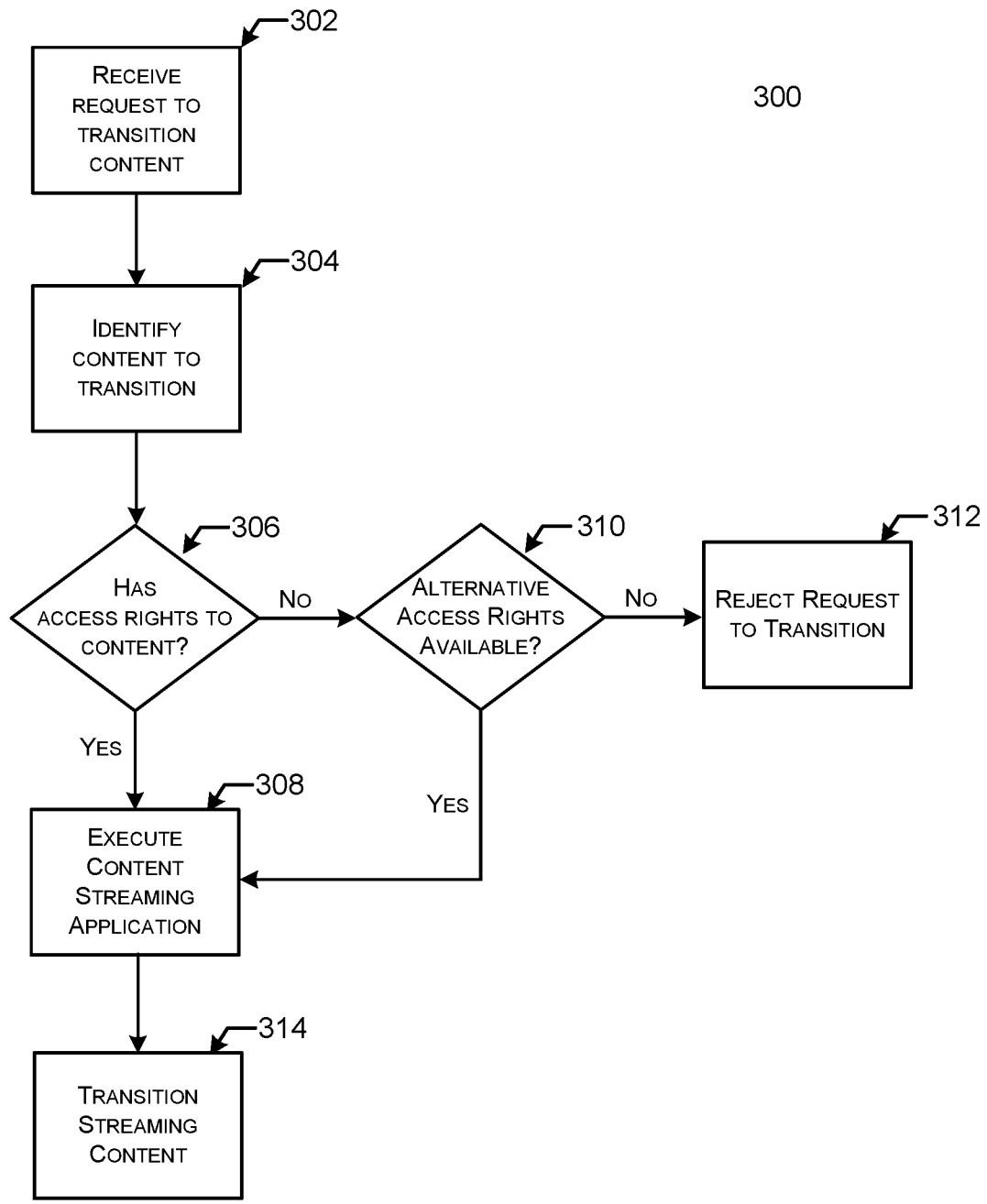
FIG. 3 depicts a flow diagram showing an example process flow for handling a transition request for transitioning streaming content between user devices in accordance with embodiments.

FIG. 3 depicts a flow diagram showing an example process flow for handling a transition request for transitioning streaming content between user devices in accordance with embodiments. The process 300 involves interactions between various components of the architecture 100 described with respect to FIG. 1. More particularly, the process 300 involves interactions between a content transition platform 102, multiple user devices 104, and at least one content provider server 132.

At 302, the process 300 comprises receiving a request to transition a content stream between user devices. The user may indicate that he or she wishes to switch from a first user device to a second user device in several different ways. For example, once the two devices are determined to be in proximity of one another (e.g., based on one device receiving a short-range signal transmitted by the other device), a user may "tap" the devices together, e.g., initiate a contact between the devices, to trigger the handoff of the content between the devices. In this example, the user devices (or one of the user devices) may determine that they have been tapped together based on that user device receiving a low-power short-range signal (e.g., a Bluetooth® signal or other suitable nearfield signal) from the other device. In this example, the "tap" may also be determined based on data received from an accelerometer or other sensor (e.g., an acceleration and a sudden deacceleration) included in at least one of the user devices. In some examples, a user may trigger the handoff of the content between the devices by performing a gesture (e.g., by holding one of the devices and gesturing). For example, an accelerometer of the user device being held may detect the gesture being performed by the user. In other examples, once the two user devices are determined to be in proximity of one another, one or both of the user devices may generate a notification allowing a user to select an option to hand off content between the devices.

In some embodiments, a user of a second user device may request that the first user device transition streaming content to the second user device. In at least some of these embodiments, the user device may send an indication of the request to the first user device, and the transition application of the first user device may receive the indication of the request. For instance, the user of the second user device may request the transition in any of the ways discussed above with respect to the user of the first user device requesting handoff. Upon submitting such a request, the content transition platform may make a determination as to whether the two user devices are associated with the same account as maintained by a wireless carrier network. Upon making a determination that the two user devices are associated with different accounts, the content transition platform may forward an indication of the request to the first user device to verify that the second user device has permission to transition the streaming content from the first user device.

In some embodiments, the process 300 may further comprise identifying a number of other user devices in proximity of the first user device (e.g., the user device from which the transition request originated). To do this, the first user device may activate a short-range wireless communication channel and may identify user devices that are in range of the first user device via that short-range wireless communication channel (e.g., those user devices that are discoverable). The first user device may then obtain device identifiers for each of the identified user devices. These device identifiers may then be provided to the content transition platform along with a transition request.

At 304, the process 300 comprises identifying streaming content to be transitioned in accordance with the request. In some embodiments, the core network of a wireless carrier network is queried to identify active communication sessions associated with one or more of the first user devices as well as the user devices indicated as being proximate to the first user device. To do this, the core network may identify network traffic managed by a gateway of the wireless carrier network that is received from, or directed toward, each of the respective user devices.

Upon identifying one or more active communication sessions for the user devices, the process 300 may further comprise determining which of those active communication sessions is the intended target of the transition request if there is more than one. In some embodiments, this may comprise determining what content streaming capabilities are available to the user device from which the transition request originated. In some cases, such a determination may be made based on a combination of hardware and/or software of the user device. For example, if a communication session relates to streaming video content accessible using a streaming video player software application associated with a particular content provider, then the communication session may be removed as a potential target communication session if the user device does not have that streaming video player software application installed. In some embodiments, the process 300 may further comprise providing a notification to the user of the user device to allow that user to select the target communication session.

In some embodiments, the transition request may indicate a single user device or communication session as the target of the transition. For example, a user may, upon initiating a request to transition streaming content, be provided with one or more options of user devices and/or streaming media content to be transitioned by a transition application installed upon the user device. In this example, the user's selection is forwarded to the content streaming platform along with the transition request.

At 306, the process 300 may optionally determine whether the user device to which the streaming content is to be transitioned has access rights in the streaming content to be transitioned. In some cases, this may comprise determining whether the user device from which the streaming content is to be transitioned and the user device to which the streaming content is to be transitioned are both associated with the same account as maintained by the wireless carrier network. In some embodiments, this may comprise determining whether the user device to which the streaming content is to be transitioned includes a session token associated with a particular software application within its memory.

Upon making a determination that the user device has access rights to the streaming content to be transitioned to it (e.g., "Yes" from decision block 306), the process 300 may comprise executing a content streaming application on the target user device. In some embodiments, this may comprise providing instructions to a transition application executed on the target user device to cause that transition application to execute an instance of the content streaming application on the target user device. In some cases, this may comprise the use of certain APIs associated with the content streaming application by the transition application.

Upon making a determination that the user device does not have access rights to the streaming content to be transitioned to it (e.g., "No" from decision block 306), the process 300 may comprise determining whether alternative access rights are available to the user device at 310. In some embodiments, this may comprise determining whether one of the two user devices involved in the transition has access rights that can be transferred to the other party. For example, a first user may have access rights that can be transferred, loaned, sold, or otherwise redistributed. In this example, the first user may have the ability to provide his or her access rights to the transitionee either permanently or for a limited amount of time and/or number of accesses. In this scenario, the first user's access credentials may be used in the process 300 to execute a content streaming application at 308 upon determining that the user's access rights in the streaming content can be transferred (e.g., "Yes" from decision block 308). However, upon determining that the user's access rights in the streaming content cannot be transferred, and that no alternative access rights exist (e.g., "No" from decision block 308), the process 300 may comprise rejecting the transition request at 312.

At 314, the process 300 comprises updating the identified communication session, such that the streaming content is caused to be transitioned between (e.g., either to or from) the user device from which the transition request was received and another user device. In embodiments, the transitioned streaming content may begin to play via the executed instance of the streaming content application on the target user device. Some exemplary techniques for updating a communication session are described in greater detail below with respect to FIG. 4 and FIG. 5.

It should be noted that in some embodiments, one user device may cease playing the particular streaming media content once a second user device begins playing the content. In other embodiments, a user device may continue playing the particular streaming media content until the content ends, the first user device is turned off, a user exits or quits an application playing the content, or any other suitable condition is met.

Figure 4:
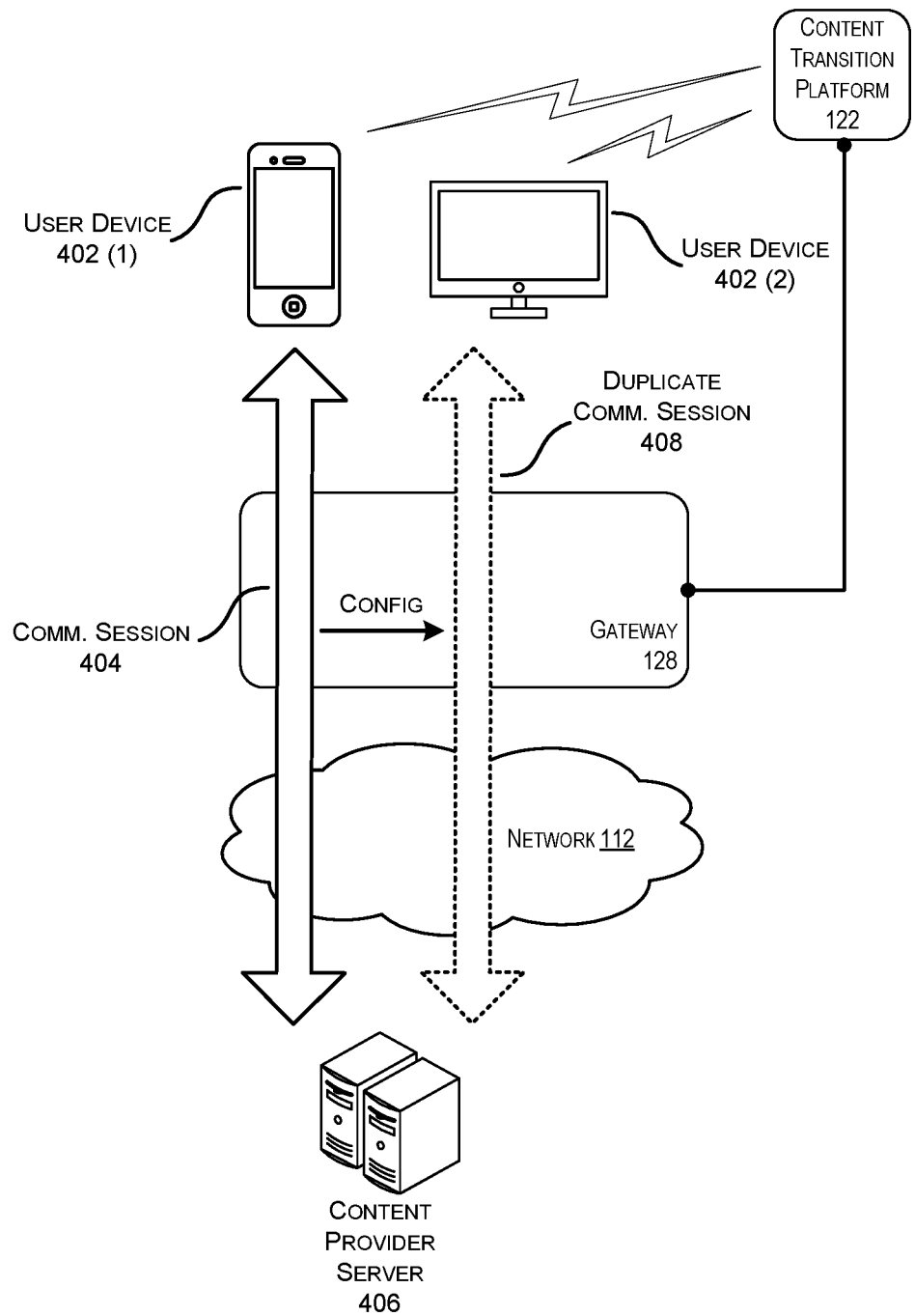
FIG. 4 depicts a diagram illustrating a first exemplary technique that may be used to update a communication session in order to transition streaming content in accordance with at least some embodiments.

FIG. 4 depicts a diagram illustrating a first exemplary technique that may be used to update a communication session in order to transition streaming content in accordance with at least some embodiments. In some embodiments, the technique illustrated in this figure may be performed by a gateway 128 in communication with a content transition platform 122, each of which reside within a wireless carrier network. Such techniques may be performed on data received from, or directed to, a content provider located outside of the wireless carrier network, via a connection to an external network 112.

Depicted in the diagram illustrated in FIG. 4 are user device 402 (1) and user device 402 (2). For the purposes of the illustrated example, consider that a transition request has been received to transition streaming content from the user device 402 (1) onto the user device 402 (2). In this example, at a point in time that the transition request is received, a communication session 404 may already be in place between the user device 402 (1) and a content provider server 406 over which streaming media content is being provided to the user device 402 (1) by the content provider server 406 for presentation on user device 402 (1).

The existing communication session 404 may use any appropriate communication protocols, such as Hypertext Transfer (or Transport) Protocol (HTTP), transmission control protocol/Internet protocol (TCP/IP), and/or Hypertext Markup Language (HTML). Data transmitted to the user device over the communication session as network traffic may be converted into video and/or audio signals via the use of a codec executed upon the user device. Such a codec may be implemented via a software application (e.g., content streaming application 226). In some embodiments, a codec may be specific to a particular type of streaming content and/or user device.

In the illustrated example, the existing communication session 404 may be duplicated to create a duplicate communication session 408. To do this, a configuration of the existing communication session 404 may be copied and used to create the duplicate communication session 408. In some embodiments, an API call is used to communicate with the content provider server 406 in order to cause it to generate a new duplicate communication session. A duplicate communication session 408 may be identical to the existing communication session other than that an identifier for the user device 402 (1) has been replaced by an identifier for the user device 402 (2).

In some embodiments, a session token is provided to the content provider server 406 that can be used to identify the existing communication session. A session token may be a string of random, or pseudorandom, characters that is mapped to a series of communications. In some embodiments, the series of communications may include login credentials, allowing the duplicate communication session to be created without requiring a new login by the user. In some embodiments, the content transition platform may provide the user's login credentials to the content provider server on behalf of the user.

As would be appreciated by one skilled in the art, the exemplary techniques described in FIG. 4 could be performed with the cooperation of a content provider server (e.g., via the use of an API associated with the content provider server).

Figure 5:
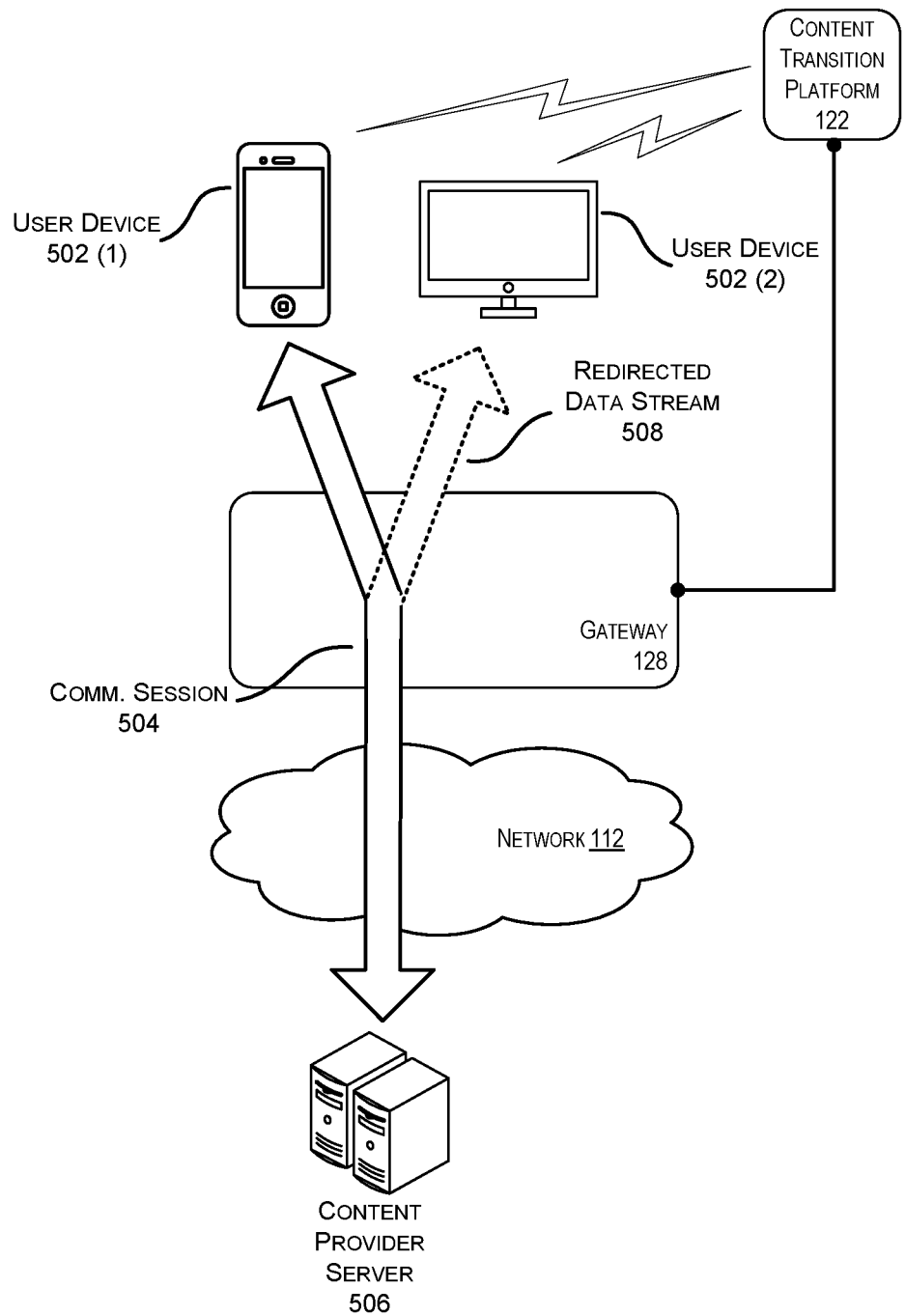
FIG. 5 depicts a diagram illustrating a second exemplary technique that may be used to update a communication session in order to transition streaming content in accordance with at least some embodiments.

FIG. 5 depicts a diagram illustrating a second exemplary technique that may be used to update a communication session in order to transition streaming content in accordance with at least some embodiments. In some embodiments, the technique illustrated in this figure may be performed by a gateway 128 in communication with a content transition platform 122, each of which reside within a wireless carrier network. Such techniques may be performed on data received from, or directed to, a content provider located outside of the wireless carrier network, via a connection to an external network 112.

Depicted in the diagram illustrated in FIG. 5 are user device 502 (1) and user device 502 (2). For the purposes of the illustrated example, consider that a transition request has been received to transition streaming content from the user device 502 (1) onto the user device 502 (2). In this example, at a point in time that the transition request is received, a communication session 504 may already be in place between the user device 502 (1) and a content provider server 506 over which streaming media content is being provided to the user device 502 (1) by the content provider server 506 for presentation.

In the illustrated example, the existing communication session 504 may be redirected from the first user device 402 (1) to the second user device 402 (2) to create a redirected data stream 508. To do this, the content transition platform 122 may cause the gateway 128 to monitor for network traffic associated with the existing communication 504. Such network traffic may then be routed to the user device 502 (2) instead of, or in addition to, being routed to the user device 402 (1). In some embodiments, the gateway may be caused to replace one or more data values included within the network traffic. For example, network traffic originating at the user device 502 (2) via the redirected data stream 508 may be stripped of any identifier for the user 502 (2), which may then be replaced with an identifier for the user device 502 (1). In some embodiments, an encryption key associated with the communication session 504 may be provided to the user device 502 (2) such that the user device is able to decrypt data received over the communication session.

As would be appreciated by one skilled in the art, the exemplary techniques described in FIG. 5 could be performed without the cooperation of a content provider server. In the illustrated example, the data stream is able to be redirected without the approval of, or knowledge by, the content provider server.

Figure 6:
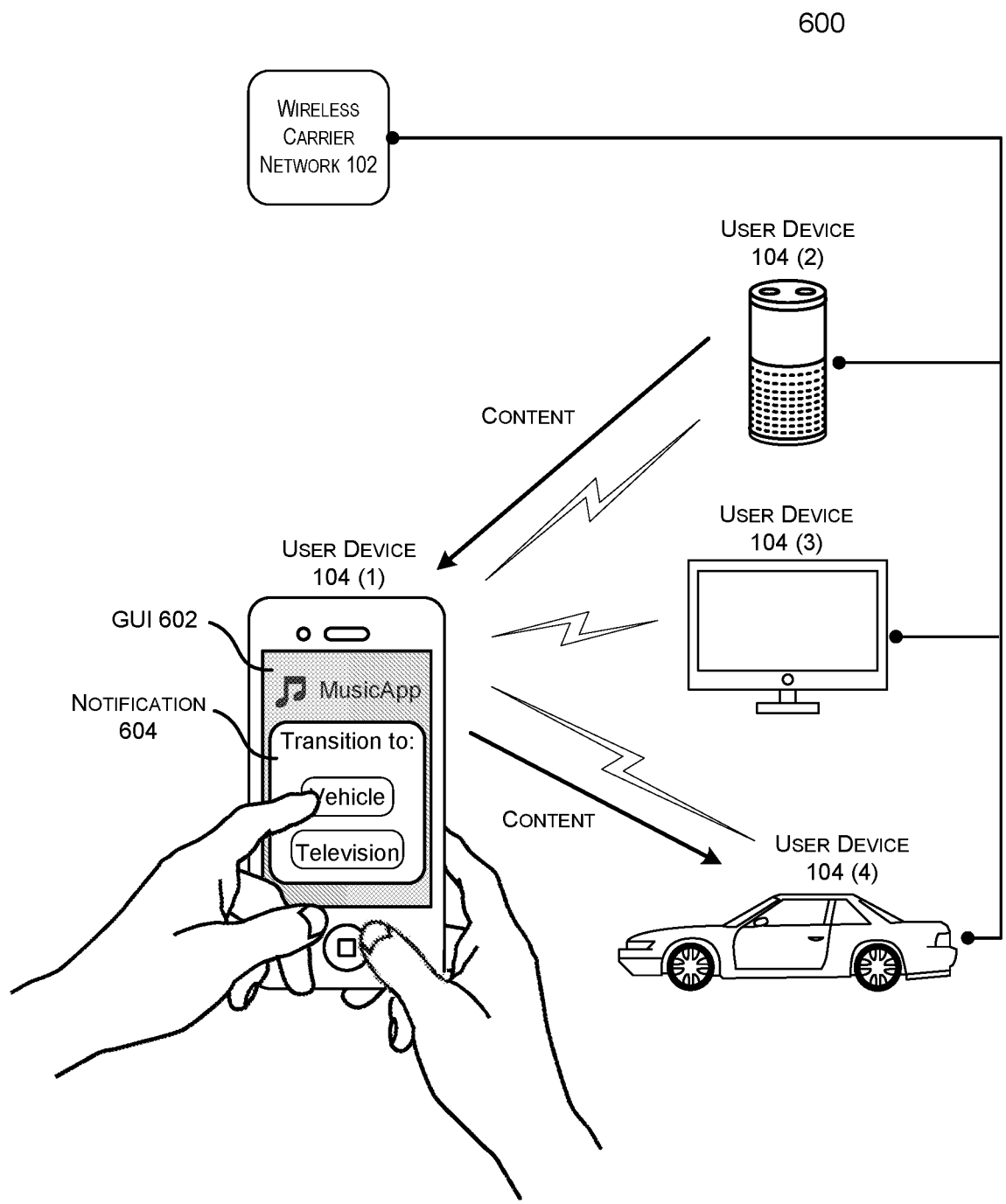
FIG. 6 depicts a diagram illustrating an exemplary use case that may be implemented in accordance with at least some embodiments.

FIG. 6 depicts a diagram illustrating an exemplary use case that may be implemented in accordance with at least some embodiments. In the scenario depicted in FIG. 6, a number of user devices 104 (1-4) may be configured to communicate using a wireless carrier network 102. Additionally, each of the user devices 104 (1-4) may be capable of short-range wireless communication.

In this example, a user may initially be listening to streaming music content via a smart speaker device represented by user device 104 (2). In this scenario, the user may need to travel to another location, which may result in the user leaving the proximity of the smart speaker. In order to continue listening to the streaming music content, the user may initiate a transition request by performing a gesture on his or her mobile device (represented by user device 104 (1)). For example, the user may "tap" the mobile device to the smart speaker to indicate that a transition should occur. In this example, because the tap would place the mobile device in close proximity of the smart speaker, it would be unlikely that multiple user devices might be detected as potential targets of the transition. Accordingly, a content transition platform of the wireless carrier device would identify the communication session associated with the streaming music content being provided to the smart speaker and determine that the streaming music content is to be transitioned to the mobile device.

In this scenario, the content streaming platform may cause an instance of a software application associated with the streaming music content to be executed on the mobile device, which may then be accessible via a graphical user interface (GUI) 602. The content transition platform may then transition the streaming music content from the smart speaker to the mobile device, such that the streaming music content is caused to be played via the software application.

Continuing with the scenario, the user may approach his or her vehicle in order to continue with his or her travel. Upon coming into vicinity of the vehicle, the user may provide another indication that the streaming music content should be transitioned, intending that it be transitioned to the vehicle. In this case, the user may enter a command via the mobile device or perform a different gesture. Upon receiving the indication that the user wishes to transition the streaming music content once more, the mobile device may perform a device discovery process. During the device discovery process, multiple user devices may be identified in the vicinity. In this example, a notification 604 may be presented to the user (e.g., as an overlay to any open applications) that allows the user to select which of the identified user devices is the intended target of the requested transition. In the depicted illustration, the user may be asked to select between the vehicle and another user device nearby. The content transition platform may then transition the streaming music content from the mobile device to the vehicle, such that the streaming music content is caused to be played via a speaker system of the vehicle.

Figure 7:
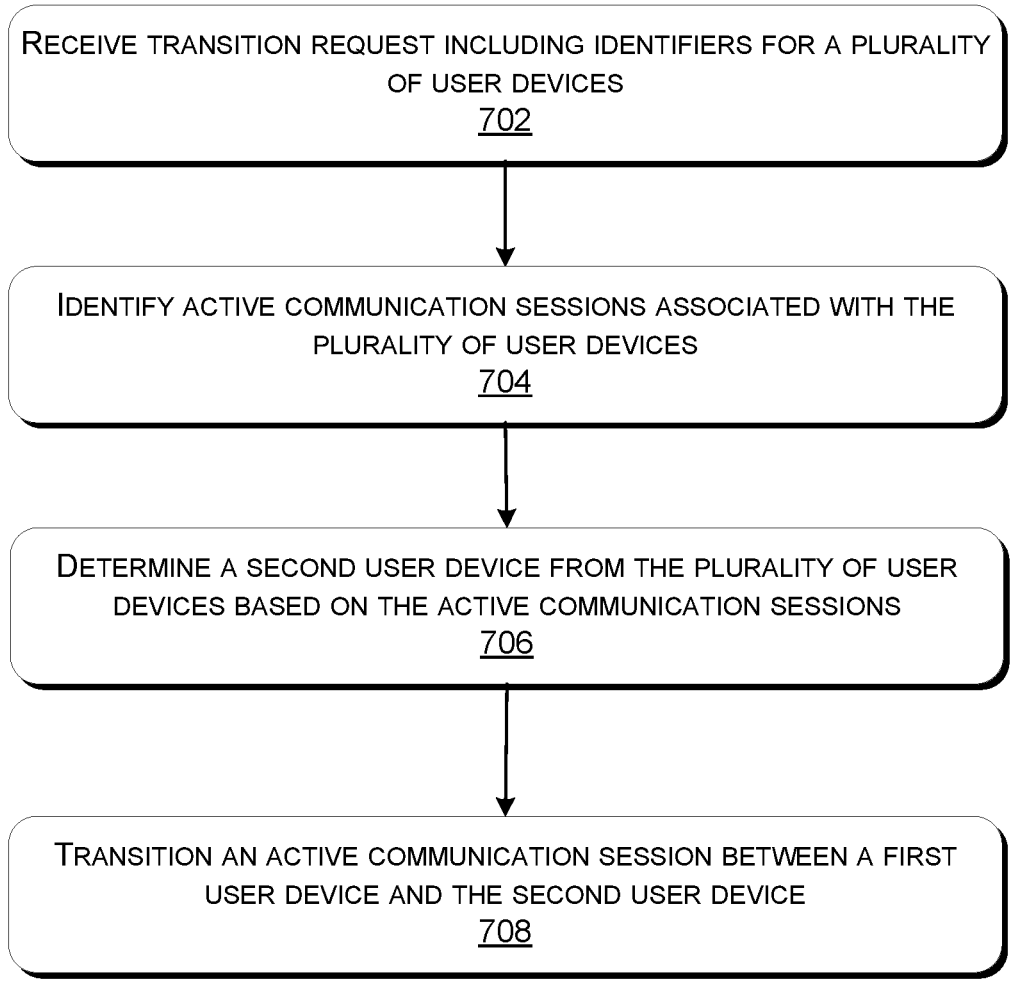
FIG. 7 depicts a block diagram showing an example process flow for transitioning streaming content between user devices in accordance with some embodiments.

FIG. 7 depicts a block diagram showing an example process flow for transitioning streaming content between user devices in accordance with some embodiments. In accordance with embodiments, the process 700 may be performed by components within a wireless carrier network 102 as discussed with respect to FIG. 1 above. For example, the process 700 may be performed by a content transition platform 122 as described with respect to FIG. 1 above.

At 702, the process 700 comprises receiving a transition request. In some embodiments, the transition request may include a set of identifiers for a plurality of user devices. The set of identifiers may include at least an identifier for a first user device from which the transition request was received. In some embodiments, the transition request is initiated on the first user device by a user of the first user device performing a gesture associated with initiation of a transition request. In some embodiments, the transition request is initiated on the first user device by a user of the first user device interacting with a transition application installed upon the first user device.

In some embodiments, the set of identifiers for the plurality of user devices is generated via a device discovery process performed by the first user device. In such embodiments, performing the device discovery process may comprise activating a short-range wireless communication channel and collecting the set of identifiers from the plurality of user devices detected within range of the first user device via the short-range wireless communication channel.

At 704, the process 700 comprises identifying one or more active communication sessions associated with the plurality of user devices. In some embodiments, identifying one or more active communication sessions comprises identifying network traffic directed to or from one or more of the plurality of user devices. In these embodiments, the network traffic may be identified by a network gateway in communication with the content transition platform. In some embodiments, the one or more active communication sessions are further identified by virtue of pertaining to streaming media content. For example, the one or more active communication sessions may be determined to pertain to streaming media content based on a type of data included in network traffic transmitted over the one or more active communication sessions. In this example, a type of data included in network traffic may be determined based on a compression protocol (e.g., a video/audio compression protocol) used to encode the data (e.g., using a data packet analyzer). In another example, the one or more active communication sessions may be determined to pertain to streaming media content based on an identity of the content provider (e.g., a source IP address for the media content).

At 706, the process 700 comprises determining a second user device from the plurality of user devices based on the identified active communication sessions. In some embodiments, determining a second user device from the plurality of user devices comprises providing an indication of user devices associated with the identified active communication sessions to a user and receiving a selection of the second user device. In some embodiments, the second user device is determined from the plurality of user devices based at least in part on one or more capabilities of the second user device. For example, a user device may be determined to be the target of the transition request if that user device is the only user device of the plurality of user devices that is capable of playing the streaming media content associated with the communication session.

At 708, the process 700 comprises transitioning an active communication session between the first user device and the second user device. In some cases, transitioning the active communication sessions between the first user device and the second user device comprises transitioning the active communication session from the first user device to the second user device. In other cases, transitioning the active communication sessions between the first user device and the second user device comprises transitioning the active communication session from the second user device to the first user device.

In some embodiments, transitioning the active communication session may comprise creating a duplicate of the active communication session, replacing one or more occurrences of a first identifier of the set of identifiers with a second identifier of the set of identifiers, and instantiating the duplicate of the active communication session. In at least some of these embodiments, the duplicate of the active communication session is created by interacting with the content provider via an API associated with the content provider.

In some embodiments, transitioning the active communication session comprises monitoring for network traffic associated with the communication session and upon detecting the network traffic associated with the communication session, rerouting that network traffic to the first user device or the second user device. In at least some of these embodiments, the process 700 may further comprise replacing one or more identifiers in the network traffic with another identifier.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
receiving, at a content transition platform, a transition request that originates from a first user device of a plurality of user devices for transitioning a communication session to a second user device of the plurality of user devices;
identifying, by the content transition platform, a plurality of active communication sessions associated with the plurality of user devices, the plurality of active communication sessions comprising a series of communications between the plurality of user devices and one or more content providers;
determining one or more active communication sessions of the plurality of active communication sessions are one or more potential targets of the transition request, wherein the determining includes removing a particular active communication session of the plurality of active communication sessions as a potential target of the transition request for transitioning from the first user device to the second user device when streaming media content of the particular active communication session is inaccessible by the first user device that originated the transition request due to at least one of a hardware or a software configuration of the first user device;
providing information regarding the one or more active communication sessions to the first user device from which the transition request originated in order to receive a selection of an active communication session that includes a content stream from the first user device; and
transitioning, by the content transition platform, the active communication session that includes the content stream to the second user device.

2. The method of claim 1, wherein the streaming media content includes streaming video content that is accessible using a streaming video player software.

3. The method of claim 1, further comprising determining, by the content transition platform, the second user device of the plurality of user devices to receive the transition of the active communication session that includes the content stream, wherein determining the second user device includes receiving a selection of the second user device from the first user device.

4. The method of claim 1, wherein the plurality of user devices are identifiable via a set of identifiers generated via a device discovery process performed by the first user device.

5. The method of claim 4, wherein performing the device discovery process comprises:
activating a short-range wireless communication channel; and
collecting the set of identifiers from the plurality of user devices detected within range of the first user device via the short-range wireless communication channel.

6. The method of claim 1, wherein the transitioning the active communication session is initiated by interacting with the content provider via an application programming interface associated with the content provider.

7. A computing device comprising:
a processor; and
a memory including instructions that, when executed with the processor, cause the computing device to, at least:
receive a transition request from a first user device of a plurality of user devices for transitioning a communication session to a second user device of the plurality of user devices;
identify a plurality of active communication sessions associated with the plurality of user devices, the plurality of communication sessions comprising a series of communications between one of the plurality of user devices and one or more content providers;
determine one or more active communication sessions of the plurality of active communication sessions are one or more potential targets of the transition request, wherein the determine includes removing a particular active communication session of the plurality of active communication sessions as a potential target of the transition request for transitioning from the first user device to the second user device when streaming media content of the particular active communication session is inaccessible by the first user device that originated the transition request due to at least one of a hardware or a software configuration of the first user device;
provide information regarding the one or more active communications sessions to the first user device from which the transition request originated in order to receive a selection of an active communication session that includes a content stream from the first user device; and
transition the active communication session that includes the content stream to the second user device.

8. The computing device of claim 7, wherein transitioning the active communication session comprises:
monitoring for network traffic associated with the active communication session; and
upon detecting the network traffic associated with the active communication session, rerouting that network traffic to the second user device.

9. The computing device of claim 7, wherein identifying one or more active communication sessions comprises identifying network traffic directed to or from one or more of the plurality of user devices.

10. The computing device of claim 7, wherein the one or more active communication sessions are further identified upon determining, using one or more data packet analysis techniques, that data packets transmitted over the one or more active communication sessions are encoded using a video/audio compression protocol.

11. The computing device of claim 10, wherein the one or more active communication sessions are determined to pertain to streaming media content based on a type of data included in network traffic transmitted over the one or more active communication sessions.

12. The computing device of claim 10, wherein the one or more active communication sessions are determined to pertain to corresponding streaming media of a content provider content based on an identity of the content provider.

13. The computing device of claim 7, wherein the transition request is initiated on the first user device by a user of the first user device performing a gesture associated with initiation of a transition request.

14. The computing device of claim 7, wherein the transition request is initiated on the first user device by a user of the first user device interacting with a transition application installed upon the first user device.

15. A non-transitory computer-readable media collectively storing computer-executable instructions that upon execution cause one or more computing devices to collectively perform acts comprising:
receiving a transition request that originates from a first user device of a plurality of user devices for transitioning a communication session to another user device of the plurality of user devices;
identifying a plurality of active communication sessions associated with the plurality of user devices, the plurality of active communication sessions comprising a series of communications between one of the plurality of user devices and one or more entities;
determining one or more active communication sessions of the plurality of active communication sessions are one or more potential targets of the transition request, wherein the determining includes determining that a particular active communication session is a potential target of the transition request when an identity of an entity associated with network traffic of the particular active communication session matches a streaming content provider included in a listing of streaming content providers;
providing information regarding the one or more active communications sessions to the first user device from which the transition request originated in order to receive a selection of an active communication session that includes a content stream from the first user device;
determining a second user device of the plurality of user devices to receive a transition of the active communication session that includes the content stream; and
transitioning the active communication session that includes the content stream.

16. The non-transitory computer-readable media of claim 15, wherein determining the second user device from the plurality of user devices comprises providing an indication of user devices associated with the identified active communication sessions to a user and receiving a selection of the second user device.

17. The non-transitory computer-readable media of claim 15, wherein the second user device is determined from the plurality of user devices based at least in part on one or more capabilities of the second user device.

* * * * *